INVENTORS
ORESTES M. BAYCURA
PIERRE ESSINGER

United States Patent Office 3,183,429
Patented May 11, 1965

3,183,429
INVERTER CONTROLLED POWER SUPPLY
Orestes M. Baycura, Vestal, and Pierre Essinger, Yorktown Heights, N.Y., assignors to International Business Machines Corporation, New York, N.Y., a corporation of New York
Filed Dec. 27, 1960, Ser. No. 78,578
9 Claims. (Cl. 321—18)

This invention relates generally to power supplies and it has reference in particular to a high frequency, inverter-controlled type power supply.

One object of this invention is to provide a static high frequency type power supply that is simple and inexpensive to manufacture and is reliable in operation.

Another object of the present invention is to provide for utilizing an inverter for chopping a 60 cycle alternating current to provide a high frequency rectangular wave output that may be readily rectified and controlled to give a stable direct current output.

Another object of the present invention is to provide for using a figure-8 control winding on a saturation-controlled transformer for chopping a 60 cycle input by means of a high frequency control signal so that it can be used to provide a readily rectified high frequency square wave output.

It is also an object of the present invention to provide for using a three-phase alternating current source and for chopping the 60 cycle waves by using a high frequency inverter signal to control saturable transformers in each phase, and for utilizing the outputs from each phase in sequence to give a relatively smooth square wave output at a high frequency.

Yet another object of the invention is to provide for using a plurality of saturation-controlled transformers in a 60 cycle three-phase circuit and for using figure-8 control windings to affect controlled-saturation of the cores in predetermined sequence by a high frequency control current for chopping the 60 cycle power to produce a high frequency square wave output from the transformers.

Yet another important object of this invention is to provide for using a variable amplitude relatively high frequency square wave generator for controlling the saturation of 60 cycle transformer means and for using a feedback signal to regulate the output voltage by varying the amplitude of the generator signal to vary the amplitude of the output voltage.

The foregoing and other objects, features and advantages of the invention will be apparent from the following more particular description of a preferred embodiment of the invention, as illustrated in the accompanying drawings.

In accordance with a preferred embodiment of the invention a plurality of pairs of saturation-controlled transformers are connected one pair each to each phase of a three-phase alternating current source, and also to an output transformer, the transformers of each pair being connected through diodes arranged in opposed relation so that the transformers of each pair handle opposite half cycles of their respective phases. Saturation control windings on the transformers are connected to a relatively high frequency inverter multivibrator so that the output of each transformer is chopped at a high frequency rate before feeding it to the output transformer, the output of which is then rectified to give a direct current output. A feedback voltage from the direct current output is utilized to control the amplitude of the multivibrator signal applied to the control windings and hence the amplitude of the rectified output.

Figure 1:
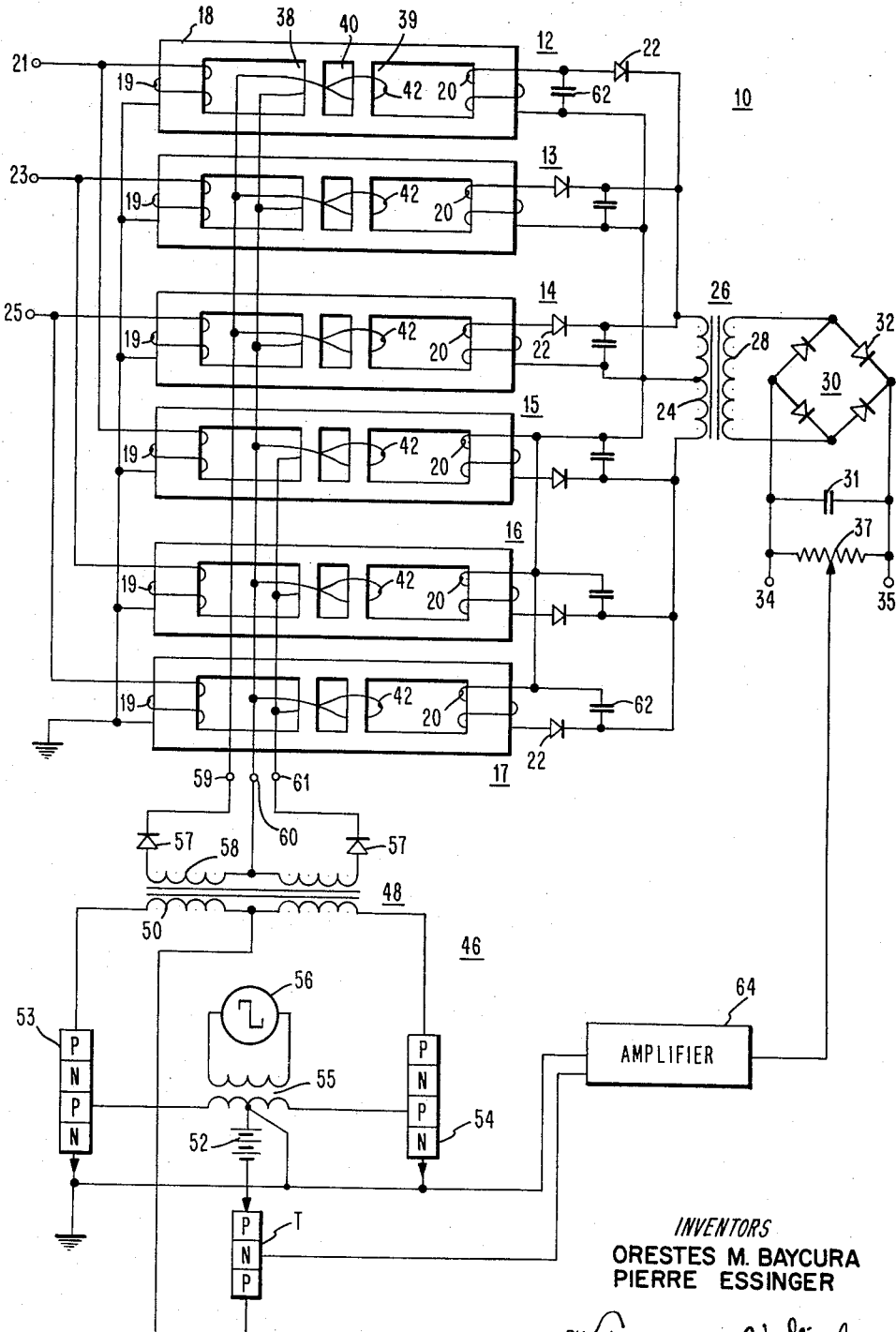
FIG. 1 is a schematic diagram of an inverter-controlled power supply embodying the invention in one of its forms.

Referring to FIG. 1 of the drawings the reference numeral 10 denotes generally an inverter-controlled power supply in which a plurality of pairs of transformers 12 through 17 have magnetic cores 18 on which are located primary windings 19 disposed to be connected to a polyphase alternating current source and secondary windings 20 which are connected through rectifier devices or diodes 22 to the opposite halves of the primary winding 24 of an output transformer 26 which has a secondary winding 28 disposed to be connected through a bridge circuit 30 of rectifier devices 32 to terminals 34 and 35 of a load circuit. A filter capacitor 31 is connected across the load circuit.

The primary windings 19 of transformers 12 and 15 are connected in parallel to one phase of the alternating current source. The primary windings 19 of the transformers 13 and 16 are connected in parallel to the second phase, while the primary windings 19 of transformers 14 and 17 are connected in parallel to the third phase of the alternating current source. The secondary windings 20 of the transformers 12, 13, and 14 are connected to the upper half of the primary winding 24 of the transformer 26 so as to supply the current through the rectifiers 22 to the upper half of the winding 24 in the same directions. The secondary windings 20 of the transformers 15, 16, and 17 are connected through rectifier devices 22 to the lower half of the primary winding 24 of the output transformer 26 so as to supply electrical energy thereto on the opposite half cycles from the respective transformers 12, 13, and 14.

Each of the transformers 12 through 17 is provided with a magnetic shunt comprising central leg portions 38 and 39 defining an opening or window 40 therebetween. Saturation control windings 42 are wound about the legs 38 and 39 of each of the transformers 12 through 17 in a figure-8 configuration so as to provide a local magnetic flux immediately about the window 40 therein for controlling saturation of the legs 38 and 39 and hence the coupling between the primary windings 19 and secondary windings 20.

In order to provide for selectively controlling the saturation of the shunts 38 and 39 of each of the transformers and hence chopping the alternating current output envelope voltage thereof, a multivibrator of the inverter type 46 is provided. This inverter comprises a transformer 48 having a center-tapped primary winding 50 the two halves of which are connected to a direct current source such as a battery 52 through suitable switch means such as transistors or silicon controlled-rectifiers 53 and 54, which are selectively controlled by a square wave generator 56 connected by a control transformer 55 to the control electrodes of the controlled rectifiers 53 and 54 for selectively triggering them and connecting their respective halves of the primary winding 50 to the battery 52. The transformer 48 is provided with a center-tapped secondary winding 58 having output terminals 59, 60, and 61 to which the saturation control windings 42 are selectively connected so that the windings 42 of transformers 12, 13, and 14 are energized on opposite half cycles of the high frequency square wave output from the transformer 48 to those of the transformers 15, 16, and 17. Blocking diodes 57 are oppositely disposed in circuit with terminals 59 and 61.

Since the amplitude of the alternating current output voltage envelope of transformers 12 through 17 is proportional to the coupling between the primary and secondary windings, this amplitude and hence the amplitude of the chopped envelope may readily be controlled and regulated by utilizing a feedback voltage such as that obtained from a potentiometer 62 across the load circuit for controlling a transistor T through an amplifier 64 to control the amplitude of the output signal of the multivibrator 46. This controls the amplitude of the chopped output from transformers 12 through 17 and hence varies the amplitude of the voltage applied to the load circuit. When the load circuit voltage increases, transistor T is biased in the off direction to reduce the control current in windings 40, increase the leakage flux through shunts 38 and 39, and reduce the voltages of secondary windings 20 and hence restores the load circuit voltage. Deviations in the opposite sense are likewise compensated for by the feedback control.

Figure 2:
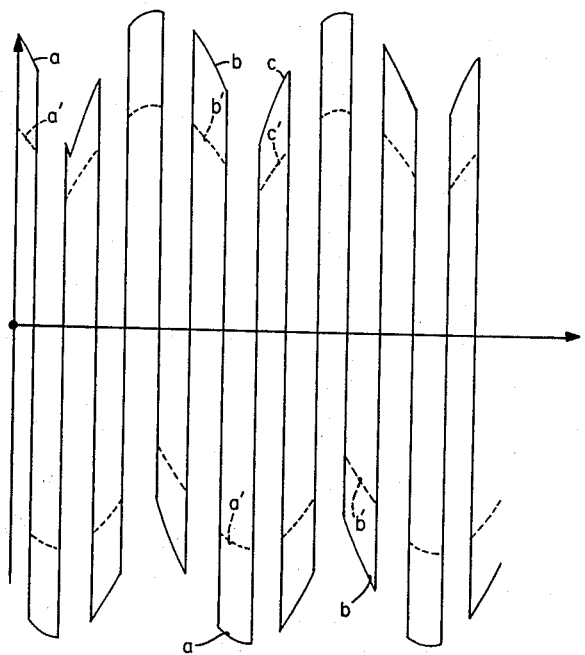
FIG. 2 shows curves illustrating the high frequency chopping of the 60 cycle input to the output transformer in FIG. 1.

With the input terminals 21, 23, and 25 connected to a three-phase alternating current source, output voltages will be produced in the secondary windings 20 of transformers 12, 13, and 14 when the shunts 38 and 39 are saturated, such output voltages being in accordance with the phases of the respective input voltages, similar output voltages also being induced in the secondary windings 20 of transformers 15, 16, and 17. The amplitudes of these output voltages vary directly as the control current in windings 40. The diodes 22 connected in circuit with the secondary windings of transformers 12, 13, and 14 restrict the voltages applied to the primary winding 24 of the transformer 26 to the positive half cycles of the waves, while the rectifiers 22 connected in circuit with the secondary windings of transformers 15, 16, and 17 permit the application of the negative half cycle of the output wave to the lower half of the primary winding 24. During each half cycle of the 60 cycle alternating current voltage the saturable control shunts 38 and 39 are selectively saturated and unsaturated by the square wave signal from the inverter multivibrator 46 to selectively permit portions of the 60 cycle waves to be induced in windings 20 during saturation, so that the 60 cycle wave is chopped into a plurality of high frequency waves conforming substantially to the envelope of the 60 cycle wave, as shown in FIG. 2 where the lower case letters $a$, $b$, and $c$ indicate the 60 cycle envelope of the $a$, $b$, and $c$ phases, respectively, of the three-phase source. The high frequency modulated three-phase waves are applied to the upper and lower halves of the primary winding of the transformer 26 through the diodes 22, only the particular transformer having the highest output voltage being effective to pass current through the primary windings at any given time because of the diodes 22, hence the voltages applied to the primary winding are selectively determined by the phase relations of the outputs and the secondary winding of the output transformer sees only a succession of relatively high frequency square wave outputs succeeding each other, the negative half cycles being inverted by the transformer action to give a substantially uniform square wave output which is rectified by the bridge circuit 30 to provide a direct current output at the terminals 34 and 35.

Since the amplitude of oscillation of the inverter multivibrator 46 is dependent on the effective value of the current through winding 50 a feedback of a portion of the output voltage by means of a voltage divider 31 and amplifier 40 provides a variable control voltage which is dependent upon the output voltage for controlling the conductivity of transistor T, the current through winding 50 and hence the current through control windings 40. This controls the saturation of shunts 38 and 39, and hence the amplitude of the output voltage of the transformers 12 through 17, as shown by the dotted curve portions $a^1$, $b^1$, and $c^1$ and the amplitude of the rectified direct current voltage applied to the load circuit. Such feedback control also aids in minimizing deviations in amplitude of the high frequency waves as dictated by the alternating current envelope and results in a much more uniform amplitude than the modulated output shown in FIG. 2.

In accordance with one embodiment of the invention each of the cores 18 is approximately 4 inches high by 8 inches long and 1 inch thick. The shunt legs are approximately ⅜ inch wide each with a ¾ inch wide opening between them. The windows are approximately 2 inches high.

The primary winding and the secondary winding each have 110 turns, and the saturation control winding has 40 turns on each leg of the shunt connected in a figure-8 configuration. The inverter multivibrator has a frequency of approximately 2,000 cycles per second and had approximately 40 volts output.

From the above description and the accompanying drawings, it will be apparent that this invention provides a readily controllable and regulated direct current voltage from an alternating current source. Regulation of the direct current voltage output may be held to close limits by using controllable amplitude inverter multivibrator for controlling the saturation of saturation controlled transformers in the manner hereinbefore described.

While the invention has been particularly shown and described with reference to a preferred embodiment thereof, it will be understood by those skilled in the art that foregoing and other changes in form and details may be made therein without departing from the spirit and scope of the invention.

What is claimed is:

1. In a converter type power supply, a magnetic core having inductively coupled input and output windings, means for connecting the input winding to a relatively low frequency alternating current source, means including a saturation control winding for controlling inductive coupling of said windings, and means for connecting the control winding to a high frequency control source for chopping the low frequency output of the output winding to produce a high frequency substantially square wave output.

2. A converter power supply comprising, a magnetic core having input and output windings thereon with magnetic shunt means for bypassing magnetic flux linking one winding and not the other, means for applying a relatively low frequency signal to the input winding, a control winding disposed in a figure-8 configuration on the shunt means for producing a local flux therein to control coupling between the input and output windings, means for connecting the control winding to a relatively high frequency source for chopping the relatively low frequency output of the output winding to produce a high frequency square wave output.

3. A converter power supply comprising a pair of transformers having magnetic cores with input and output windings thereon, magnetic shunt means providing a leakage flux path for each core for magnetic flux linking one winding and not the other, a figure-8 control winding on each of the shunt means for controlling the saturation thereof, means for connecting the input windings to a relatively low frequency source, an output transformer, means including oppositely disposed rectifiers connecting the output windings to the output transformer in opposite senses, and means for applying a high frequency square wave to the control windings in opposed senses for producing a high frequency square wave output from the output transformer.

4. A converter power supply comprising, a plurality of pairs of transformers each having input and output windings with saturation control windings producing localized magnetic fluxes for controlling the inductive coupling therebetween, an output transformer, unidirectional current means connecting the output windings of the transformers of each pair to the output transformer in opposite senses, circuit means connecting the input windings of each pair of transformers to one phase of a relatively low frequency polyphase source in opposite senses, and circuit means connecting the transformers of each pair to a high frequency control source in opposed relation.

5. In a converter power supply, a main transformer having input and output windings for supplying electrical energy to a load circuit, a pair of auxiliary transformers each having a core with inductively coupled input and output windings thereon for supplying electrical energy to the main transformer from a relatively low frequency source and having magnetic shunt means between said windings having a saturation control winding, unidirectional current means connecting the output windings of the auxiliary transformers to the input winding of the main transformer in opposed relation, and control means including a high frequency source connected to the control windings of the auxiliary transformers in opposed relation for controlling saturation of the shunt means in alternate sequence.

6. A converter power supply comprising, main transformer means having input and output windings for supplying electrical energy to a load circuit, auxiliary transformer means having input windings connected to a relatively low frequency alternating source and output windings inductively coupled therewith on a magnetic core and having magnetic shunt means therebetween with saturation control means thereon, unidirectional means connecting the output windings of the auxiliary transformer means to the input winding of the main transformer means in opposite senses, and control means for providing a high frequency rectangular wave connected to the control windings for effecting selective saturation of the shunt means on opposite half cycles of the high frequency wave.

7. In a converter power supply, a transformer having input and output windings, auxiliary transformer means having primary windings connected to a relatively low frequency alternating current source and secondary windings selectively connected to the transformer input winding, control means including a saturable shunt and a control winding controlling magnetic coupling of the primary and secondary windings, and means including a high frequency generator connected to the control winding for chopping the output wave form of the secondary winding.

8. In a converter type power supply, a main transformer having input and output windings, rectifier means connecting the output winding to a load circuit, three pairs of auxiliary transformers having primary windings connected to a relatively low frequency three-phase source and secondary windings separated from the primary windings by magnetic shunts having saturation control windings, unidirectional means connecting the secondary windings of each pair to the main transformer input winding in opposite senses, a relatively high frequency controllable square wave control source, means connecting the control source to the control winding of each pair of auxiliary transformers in opposed relation, and means connecting the output circuit to the control source to vary the amplitude of the high frequency source in accordance with the voltage of the load circuit.

9. A converter power supply comprising, a main transformer having input and output windings, rectifier means connected in circuit with the secondary winding to supply direct current to a load circuit, a plurality of pairs of control transformers for supplying electrical energy to the main transformer from a relatively low frequency source each having primary and secondary windings on a magnetic core with a magnetic shunt therebetween having a saturation control winding, means including a unidirectional current device connecting the secondary windings of each pair to the input winding of the main transformer in opposed senses, a controllable square wave multivibrator oscillator connected to the control windings of each pair in opposite senses, and means connecting the load circuit to the multivibrator to vary the amplitude of oscillation thereof in accordance with the voltage of the load circuit.

References Cited by the Examiner
UNITED STATES PATENTS

| 2,519,425 | 8/50 | Barlow | 323—56 X |
| 2,519,426 | 8/50 | Grant | 323—56 |
| 2,568,172 | 9/51 | Spencer | 321—25 |
| 2,685,653 | 8/54 | Orr et al. | 307—106 |
| 2,888,630 | 5/59 | Seliger et al. | 321—25 |
| 2,888,637 | 5/59 | Lipkin | 323—56 |
| 2,940,013 | 6/60 | Cook | 323—56 X |

LLOYD MCCOLLUM, *Primary Examiner.*

SAMUEL BERNSTEIN, *Examiner.*